Aug. 12, 1969  P. R. BROWN  3,460,848
POWER OPERATED COLLET CHUCKS
Filed June 30, 1967  2 Sheets-Sheet 1

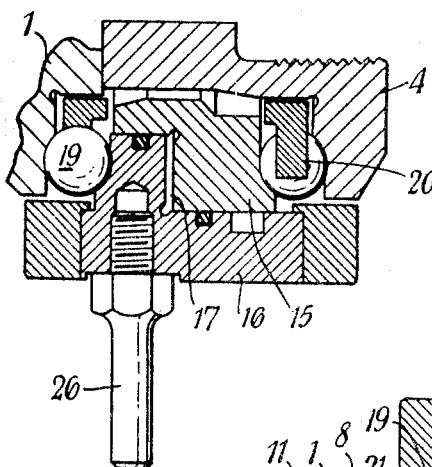
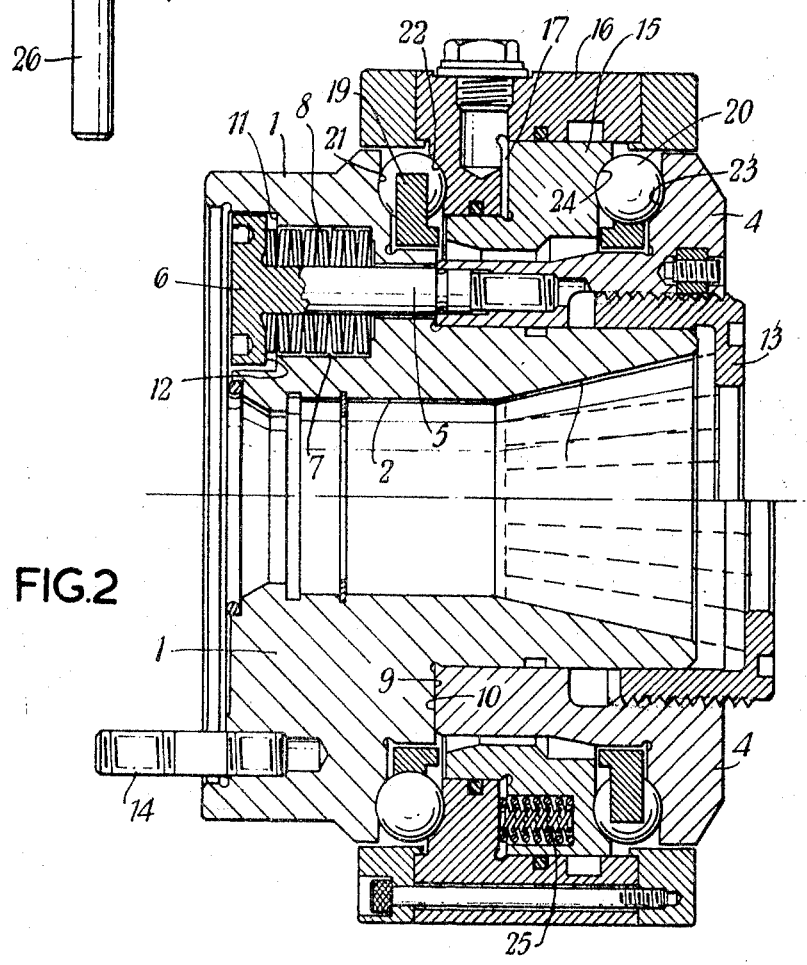

United States Patent Office 3,460,848
Patented Aug. 12, 1969

3,460,848
POWER OPERATED COLLET CHUCKS
Patrick Rowden Brown, Guildford, England, assignor to F. Burnerd & Co. Limited, Winnall, Winchester, Hampshire, England, a British company
Filed June 30, 1967, Ser. No. 650,451
Claims priority, application Great Britain, Sept. 29, 1966, 43,503/66
Int. Cl. B23b *31/20, 31/30*
U.S. Cl. 279—4
2 Claims

ABSTRACT OF THE DISCLOSURE

A power operated collet chuck having mutually movable body portions one of which is internally tapered to receive a collet and a piston and cylinder assembly around the body portions with two ball or roller bearings, one bearing between one body portion and the piston and the other bearing between the other body portion and the cylinder, the bearings acting as combined thrust and journal bearings.

---

This invention relates to power operated collet chucks and has for its main object the provision of such a chuck which is of simple construction and which enables large variations in work diameter to be accommodated automatically. This accommodation is of importance particularly in capstan lathes where the feed of the work is automatic.

According to the present invention there is provided a power operated collet chuck, including a first body portion having a bore therethrough part of which is tapered for the reception of a collet and a second body portion axially movable in relation to the first body portion and having an adjustable end cap for retaining collets of different sizes within the tapered part of the first body portion, a piston and cylinder assembly around the body portions and opposed ball or roller bearings between the body portions and the assembly, the said piston and cylinder assembly being non-rotatably carried by the body portions solely by the provision of the said opposed ball or roller bearings, the arrangement being such that fluid pressure causing relative axial movement between the piston and cylinder effects, through the opposed ball or roller bearings, relative axial movement of the body portions against spring means to allow opening of the collet and removal of said fluid pressure allows said spring means to effect reverse relative axial movement of the body portions to close the collet.

One embodiment of a power operated collet chuck according to the invention will now be described, by way of example only, and with reference to the accompanying drawings, in which:

FIG. 2 is a cross-sectional view on the line II—II of FIG. 1 and shows diagrammatically the adjustment of the cap for retaining collets of different sizes; and FIG. 3 is a cross-sectional view on the line III—III of FIG. 1.

Figure 1:
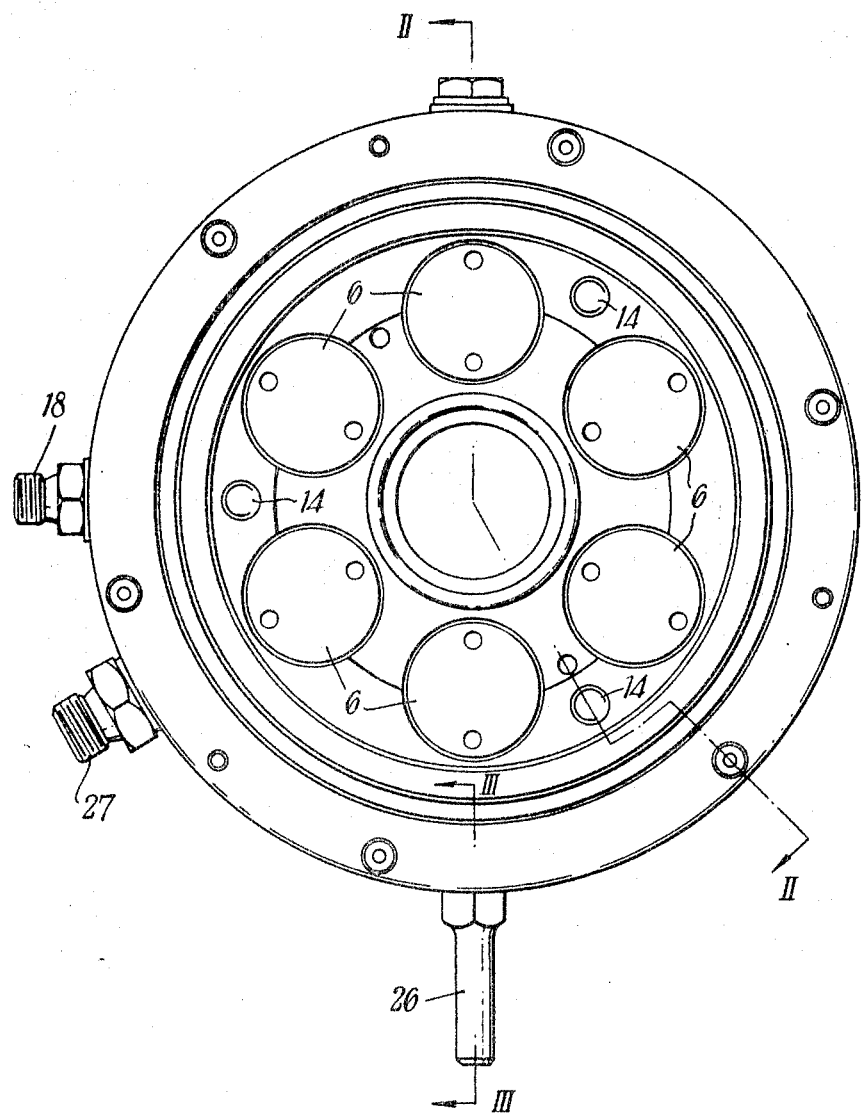
FIG. 1 is an end view of a chuck in accordance with the invention.

The chuck includes a first body portion 1 having a bore 2 therethrough through which the work passes, the bore 2 having a tapered part 3 within which lies a spring loaded collet of known type. Axially slidable on the first body portion 1 is a second body portion 4 into which are screwed six bolts 5 having heads 6. More or less than six bolts may be employed. Within recesses 7 in the first body portion 1 is spring means in the form of disc springs 8 whereby the body portions 1 and 4 are urged together so that surfaces 9 and 10 abut. There is a clearance between surfaces 11 and 12 allowing relative axial movement of body portions 1 and 4 compressing springs 8. The second body portion 4 carries an end cap 13 which retains the collet within the tapered part 3. The end cap 13 is screwed into second body portion 4 for adjustment purposes so as to retain collets of different sizes as shown diagrammatically in FIG. 2. The first body portion 1 is provided with pins 14 for attachment to a lathe or the like.

Around the body portions 1 and 4 is a piston and cylinder assembly including a piston 15 and a cylinder 16 there being an annular pressure chamber 17 between them into which fluid pressure may be admitted through connection 18.

Between the piston and cylinder assembly 15, 16 and the body portions 1 and 4 are opposed caged ball bearings 19 and 20, each bearing running in tracks of arcuate cross-section. The balls of bearing 19 run in opposed arcuate tracks 21 and 22, the former being in first body portion 1 and the latter being in cylinder 16. The balls of bearing 20 run in opposed arcuate tracks 23 and 24, the former being in second body portion 4 and the latter being in piston 15. These bearings 19 and 20 serve to transmit the force exerted by the fluid pressure in chamber 17 to permit opening of the collet and enable the body portions 1 and 4 to rotate freely within the piston and cylinder assembly 15, 16 thus obviating the need for separate thrust bearings and needle bearings found in known chucks of this nature. Bearings 19 and 20 serve as combined thrust and journal bearings.

Light springs 25 urge the piston 15 and cylinder 16 apart to prevent chatter during use and the cylinder 16 is provided with a pin 26 which engages a fixed part of a lathe or the like to prevent rotation of the piston and cylinder assembly.

Fog lubrication is provided through connection 27 for the ball bearings 19 and 20.

In previously proposed chucks which utilize radially movable balls to close the collet, the gripping range of the chuck without the necessity for readjustment was of the order of $\frac{3}{1000}$ of an inch; this is insufficient to cover the tolerance band of commercial bar stock. This has caused considerable difficulty in automatic applications where constant attention by the operator is not usual. However, with the chuck of the present invention the gripping range is of the order of $\frac{40}{1000}$ of an inch without the need for adjustment.

A chuck in accordance with the invention may be modified from that described above within the scope of the invention as defined in the appended claims, for example, the bearings may comprise roller bearings.

I claim:
1. In a power operated collet chuck including,
   a first body portion having a bore therethrough part of which is tapered for the reception of a collet,
   a second body portion axially movable in relation to the said first body portion,
   an end cap carried by the said second body portion for retaining the collet within the said tapered part of the first body portion,
   spring means urging the said first and second body portions to the collet closed position, and
   a piston and cylinder assembly around the said first and second body portions,
   wherein the improvement comprises,
      a first bearing between the said first body portion and the said cylinder, and
      a second bearing, opposed to the said first bearing, and positioned between the said second body portion and the said piston,
      whereby fluid pressure actuation of the said piston and cylinder assembly, causing relative axial movement of the said piston and cylinder, effects, through the opposed first and second bearings, relative axial movement of the said first and second body portions to allow opening of the collet and removal of said fluid pressure allows said spring means to effect reverse relative axial movement of said first and second body portions to close the collet.

2. A power operated collet chuck as claimed in claim 1, wherein the improvement further comprises said first and second bearings being caged balls, each ball bearing running in diametrically opposed tracks of arcuate cross-section on a body portion and the piston and cylinder assembly.

References Cited

UNITED STATES PATENTS

| | | | |
|---|---|---|---|
| 489,933 | 1/1893 | Conradson | 279—4 X |
| 2,587,230 | 2/1952 | Schaad | 279—4 X |
| 3,168,322 | 2/1965 | Dziedzic | 279—4 |

FOREIGN PATENTS

| | | |
|---|---|---|
| 943,494 | 12/1963 | Great Britain. |

LESTER M. SWINGLE, Primary Examiner

U.S. Cl. X.R.

279—51